3,251,881
N,N,N',N'-TETRAKIS(p-NITRO- OR AMINO-SUB-
STITUTED-PHENYL)-p-ARYLENEDIAMINES
Peter Vincent Susi, Middlesex, and Norma Ann Weston, Somerville, N.J., assignors to American Cyanamid Company, Stamford, Conn., a corporation of Maine
No Drawing. Filed July 16, 1963, Ser. No. 295,524
5 Claims. (Cl. 260—576)

This invention relates to a new class of N,N,N',N'-tetrakis(p - substituted - phenyl) - p - phenylenediamines and benzidines. It also presents a process for making said new compounds and to their use as intermediates in making aminium and diimonium salts.

More particularly, the invention is concerned with diamines of the following Formula I

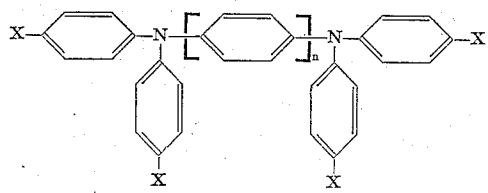

Formula I wherein X is —NO₂ or —NH₂ and n is one or two.

It will be noted that the "amines" of Formula I are derivatives of two similarly N,N'-substituted diamino compounds; i.e., p-phenylenediamines (where n=1) and benzidines (where n=2). If so desired, the phenyl groups may be further substituted with groups which are inert in use, as for example, by lower alkyl or alkoxy, halogen, hydroxyl and the like.

The nitro compounds of this invention; i.e., the substituted p-phenylenediamines and benzidines of Formula I are prepared from readily available starting materials by the reaction illustrated in the following reaction scheme (A).

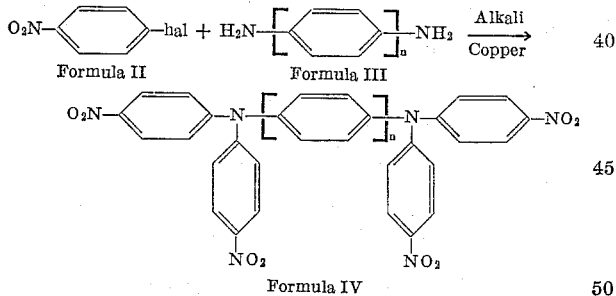

Formula IV

Reaction of a p-nitrohalobenzene of Formula II with a p-phenylenediamine or benzidine of Formula III is carried out in a suitable solvent, preferably dimethylformamide, in the presence of an alkali, such as sodium or potassium carbonate, and in addition optionally and preferably, in the presence of copper powder.

Illustrative p-nitrohalobenzenes of Formula II include, for example, p-nitrochlorobenzene, p-nitrobromobenzene, p-nitroiodobenzene, p-nitrofluorobenzene, 3,4-dichloronitrobenzene, 2-chloro-5-nitrotoluene, 2-chloro-5-nitroethylbenzene, 2-nitro-5-bromotoluene, 2-chloro-5-nitro anisole and the like.

Illustrative p-phenylenediamines of Formula III when n is one include, for example, p-phenylenediamine, p-toluylenediamine and the like; and the benzidines (compounds of (III)) when n is two include benzidine, 3,3'-dichlorobenzidine, o-tolidine, o-dianisidine, m-tolidine and the like.

Compounds of Formula I wherein X is NH₂; i.e., the "amino" compounds are readily prepared by reduction of "nitro" compounds of Formula IV. This is done conveniently by catalytic hydrogenation in a suitable solvent, again preferably dimethylformamide. Standard catalysts for the hydrogenation of aromatic nitro compounds may be used. These include palladium on charcoal and Raney nickel. This is illustrated by the following reaction scheme (B).

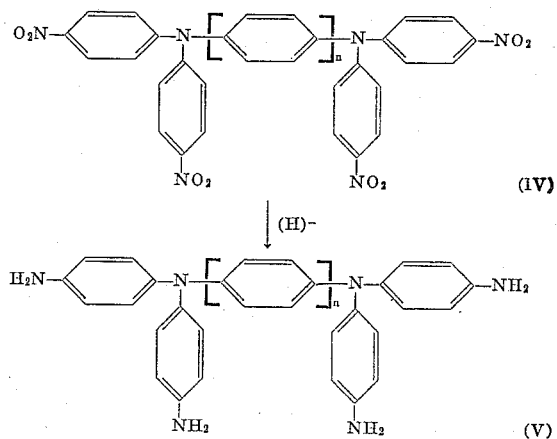

It has been stated above that the benzene rings of Formula I may bear inert substituents, such as halogen, lower alkyl or alkoxy. These substituted products may be derived from the correspondingly substituted starting materials of Formulae II and III. As also noted above, the two types of intermediates of Formulae IV and V are believed to be new compounds.

The invention will be further illustrated in conjunction with the following examples. Therein, unless otherwise noted all parts and percentages are by weight and all temperatures are in degrees centigrade.

EXAMPLE 1.—N,N,N',N'-TETRAKIS(p-NITRO-PHENYL)-p-PHENYLENEDIAMINE

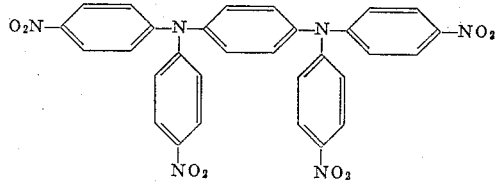

A mixture of 10.8 parts (0.1 mol) of p-phenylenediamine, 94.5 parts (0.6 mol) of p-nitrochlorobenzene, 31.7 parts (0.23 mol) of potassium carbonate and 2 parts of copper powder are stirred and refluxed for 48 hours in 150 parts dimethylformamide. The mixture is then filtered and the solid washed well with dimethylformamide, water, acetone and then dried. There is obtained about 37 parts (59%) of red-brown solid, M.P. 387–390° C. An eight fold run gave a 76% yield of product melting at 390° C. After recrystallization from nitrobenzene, a sample had a melting point of 390°–392° C., and the following analysis:

Calc'd for $C_{30}H_{20}N_6O_8$: C, 60.8; H, 3.4; N, 14.2. Found: C, 60.7; H, 3.5; N, 13.9.

EXAMPLE 2.—N,N,N',N'-TETRAKIS(p-NITRO-PHENYL)BENZIDINE

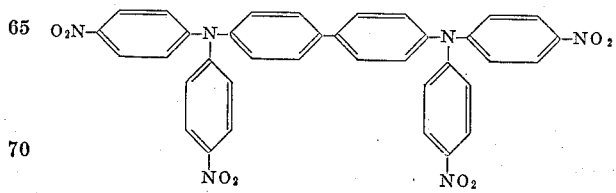

A mixture of 9.2 parts (0.05 mol) of benzidine, 47.3 parts (0.3 mol) of p-nitrochlorobenzene, 16.6 parts (0.12 mol) of anhydrous potassium carbonate, 1.0 part of copper powder and 75 parts dimethylformamide is stirred and refluxed for four days. The mixture is then filtered, washed well with dimethylformamide, water, and acetone, and dried. About 24.0 parts of an orange powder is obtained (71% yield). Melting point 370°–374° C.

EXAMPLES 3 TO 11

Various materials are substituted for the p-nitrochlorobenzene and p-phenylenediamine or benzidine (of Formulae II and III respectively) in the procedure of Example 1 or 2. The starting materials and products are shown in the following Table I.

*Table I*
STARTING MATERIALS

| Ex. No. | (of) Formula (II) | (of) Formula (III) |
|---|---|---|
| 3 | p-Nitrobromobenzene | p-Phenylenediamine. |
| 4 | p-Nitroiodobenzene | p-Toluylenediamine. |
| 5 | 3,4-dichloronitrobenzene | Chloro-p-phenylenediamine. |
| 6 | do | Benzidine. |
| 7 | 2-chloro-5-nitrotoluene | o-Tolidine. |
| 8 | 2-chloro-5-nitroethylbenzene | o-Dianisidine. |
| 9 | p-Nitrochlorobenzene | m-Tolidine. |
| 10 | do | 3,3'-Dichlorobenzidine. |
| 11 | 2-chloro-5-nitroanisole | p-Phenylenediamine. |

PRODUCTS OF FORMULA (IV)

Example number
3 Product of Example 1
4 N,N,N',N'-Tetrakis(p-nitrophenyl)-p-toluylenediamine
5 N,N,N',N'-Tetrakis(o-chloro-p-nitrophenyl)-chloro-p-phenylenediamine
6 N,N,N',N'-Tetrakis(o-chloro-p-nitrophenyl)-benzidine
7 N,N,N',N'-Tetrakis(o-methyl-p-nitrophenyl)-o-tolidine
8 N,N,N',N'-Tetrakis(o-ethyl-p-nitrophenyl)-o-dianisidine
9 N,N,N',N'-Tetrakis(p-nitrophenyl)-m-tolidine
10 N,N,N',N'-Tetrakis(p-nitrophenyl)-3,3'-dichlorobenzidine
11 N,N,N',N'-Tetrakis(o-methoxy-p-nitrophenyl)-p-phenylenediamine EXAMPLE 12.—N,N,N',N'-TETRAKIS(p-AMINO-PHENYL)-p-PHENYLENEDIAMINE

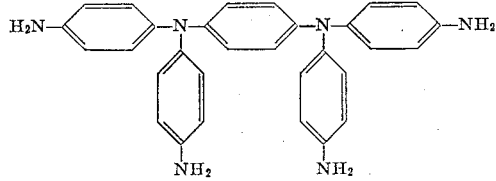

A mixture of 29.6 parts (0.05 mol) of N,N,N',N'-tetrakis(p-nitrophenyl)-p-phenylenediamine (from Example 1), 1 part of 10% palladium-on-carbon catalyst and 100 parts of dimethylformamide is hydrogenated at 90° C. in a hydrogenation autoclave until the theoretical pressure drop is obtained. The mixture is filtered and the filtrate is poured into 300 parts of water. The solid which separates is recrystallized from an ethanol-dimethylformamide mixture, giving about 15 parts (64%) of purified product, melting above 300° C. and having the following analysis.

Calc'd for $C_{30}H_{28}N_6$: C, 76.2; H, 5.97; N, 17.8.
Found: C, 76.1, H, 5.97; N, 17.8.

EXAMPLE 13.—N,N,N',N'-TETRAKIS(p-AMINO-PHENYL)BENZIDINE

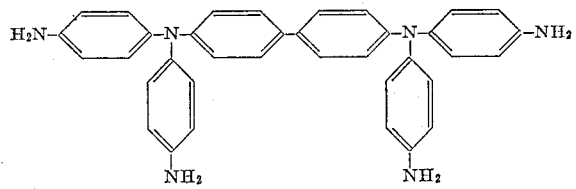

A mixture of 24.0 parts (0.035 mol) of N,N,N',N'-tetrakis(p-nitrophenyl)benzidine (from Example 2), 1 part of 10% palladium-on-carbon catalyst and 100 parts of dimethylformamide is hydrogenated at 80° C. in a hydrogenation autoclave until the theoretical pressure drop is observed. The mixture is filtered and the filtrate is diluted with 300 parts of water. The solid which separates is recrystallized from a mixture of dimethylformamide and ethanol, giving about 11.2 parts (55% yield) of product, melting at 313°–316° C.

Calc'd for $C_{36}H_{32}N_6$: C, 78.8; H, 5.84; N, 15.3.
Found: C, 77.9; H, 5.90; N, 16.7.

EXAMPLES 14 TO 21

In the procedure of Example 12 or 13, the products of Examples 3 to 11 are substituted for the p-phenylenediamine or benzidine compound of that example. The products are shown in the following Table II.

*Table II*

| Ex. No. | Starting Comp. from Ex. No. | Product of Formula (V) |
|---|---|---|
| 14 | 4 | N,N,N',N'-tetrakis(p-aminophenyl)-p-toluylenediamine. |
| 15 | 5 | N,N,N',N'-tetrakis(o-chloro-p-aminophenyl)-chloro-p-phenylenediamine. |
| 16 | 6 | N,N,N',N'-tetrakis(o-chloro-p-aminophenyl)-benzidine. |
| 17 | 7 | N,N,N',N'-tetrakis(o-methyl-p-aminophenyl)-o-tolidine. |
| 18 | 8 | N,N,N',N'-tetrakis(o-ethyl-p-aminophenyl)-o-dianisidine. |
| 19 | 9 | N,N,N',N'-tetrakis(p-aminophenyl)-m-tolidine. |
| 20 | 10 | N,N,N',N'-tetrakis(p-aminophenyl)-3,3'-dichlorobenzidine. |
| 21 | 11 | N,N,N',N'-tetrakis(o-methoxy-p-aminophenyl)-p-phenylenediamine. |

As shown in the copending application Serial No. 281,059, filed May 16, 1963, by one of us; and our copending application Serial No. 281,056, also filed May 16, 1963; various "aminium" compounds such as tris(p-dialkylaminophenyl)-aminium salts previously have been proposed for use in various substrates to decrease transmission in the infrared region of the spectrum. Such salts do absorb strongly in the "near" infrared region of the spectrum. However, most effective protection occurs in the vicinity of 960 millimicrons. Suitable compounds capable of broad absorption at longer wave-lengths in the near infrared have been desired but in the past have not been available.

As shown in the above-noted applications, compounds having the desired properties are derived readily from compounds of Formula V, above, of the present invention. The compounds of that formula are converted to suitably substituted N,N,N',N'-derivatives as shown in the following reaction scheme (C).

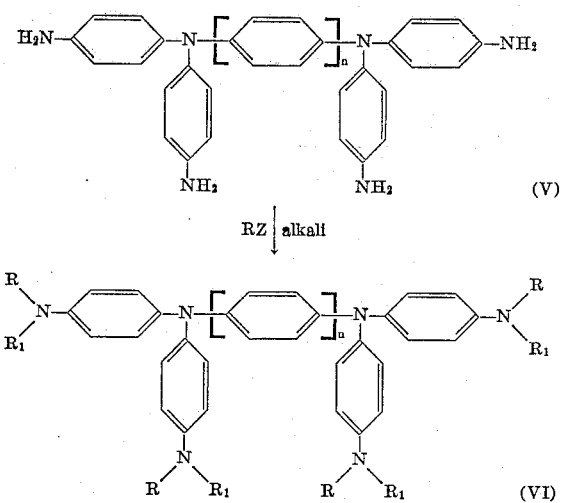

wherein R is allyl or an alkyl of one to twelve carbon atoms; $R_1$ is selected from hydrogen and R; and $n$ is again one or two; and RZ is an alkyl ester of an inorganic acid.

The amino compound of Formula V is reacted in a suitable solvent, such as aqueous acetone, with the reactant RZ which may be an alkyl halide such as methyl chloride, ethyl iodide, propyl bromide, butyl iodide, hexyl bromide, octyl bromide, dodecyl bromide and the like; or an alkyl sulfate, such as methyl sulfate, ethyl sulfate and the like; or an alkyl arylsulfonate, such as methyl p-toluenesulfonate. An allyl halide, such as allyl bromide, also may be used. An alkali or alkaline salt such as sodium carbonate or potassium carbonate also normally is used. Reaction proportions and conditions are so selected that either one or two R groups per amino group are introduced. A typical illustration is shown in the following examples.

EXAMPLE 22.—N,N,N',N'-TETRAKIS(p-DIETHYL-AMINOPHENYL)-p-PHENYLENEDIAMINE

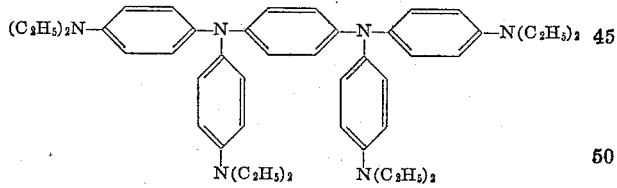

A mixture of 14.2 parts (0.03 mol) of N,N,N',N'-tetrakis(p-aminophenyl)-p-phenylenediamine (from Example 12), 56.2 parts (0.36 mol) of ethyl iodide and 33.1 parts (0.24 mol) of potassium carbonate is stirred and refluxed for four hours in 200 parts of 80% aqueous acetone. The mixture is then cooled and filtered. The solid collected is washed with water, dried and then recrystallized from dimethylformamide-ethanol mixture. The product is obtained as a yellow-green solid, M.P. 214°–215° C. Its analysis follows.

Calc'd for $C_{38}H_{44}N_6$: C, 79.3; H, 8.7; N, 12.1. Found: C, 79.2; H, 8.7; N, 12.0.

EXAMPLE 23.—N,N,N',N'-TETRAKIS(p-DIETHYL-AMINOPHENYL)BENZIDINE

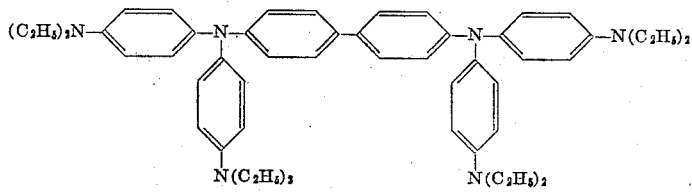

A mixture of 11.0 parts (0.02 mol) of N,N,N',N'-tetrakis(p-aminophenyl)benzidine (from Example 13), 37.4 parts (0.24 mol) of ethyl iodide, 22.1 parts (0.16 mol) of anhydrous potassium carbonate, and 160 parts of 80% aqueous acetone is stirred and refluxed for 5 hours. The mixture is cooled and filtered, and the solid is washed well with water and then with acetone and dried. The product is recrystallized from hot dimethylformamide to give a solid, about 9.5 parts (62% yield), melting point 213°–214.5° C.

Calc'd for $C_{52}H_{64}N_6$: C, 80.83; H, 8.29; N, 10.88. Found: C, 78.21; H, 8.14; N, 11.49.

Compounds of Formula VI are then oxidized to the final desired protective "aminium" or "diimonium" salts by oxidation of the amino compounds. This is carried out in organic solvent solution by reacting the p-phenylenediamine or benzidine compound of Formula VI with a silver salt of a suitable acid. This general method is shown in Neunhoeffer et al., Ber., 92, 245 (1959).

Dimethylformamide is a good solvent for use as the reaction medium. Others, such as acetone may be used. A wide variety of silver salts may be used. These include the perchlorate ($ClO_4^-$), fluoborate ($BF_4^-$), trichloracetate ($CCl_3COO^-$), trifluoroacetate ($CF_3COO^-$), picrate $(NO_2)_3C_6H_2O^-$, hexafluoroarsenate ($AsF_6^-$), hexafluoroantimonate ($SbF_6^-$), benzenesulfonate ($C_6H_5SO_3^-$), ethanesulfonate ($C_2H_5SO_3^-$), phosphate ($PO_4^\equiv$), sulfate ($SO_4^{--}$), chloride ($Cl^-$) and the like.

Oxidation of one amino group of compounds of Formula VI produces "aminium" compounds of the following Formula VII:

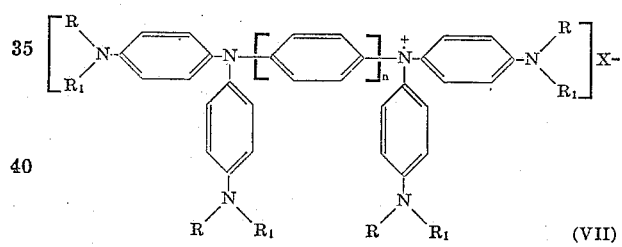

and of two amino groups the diimonium compounds of the following Formula VIII;

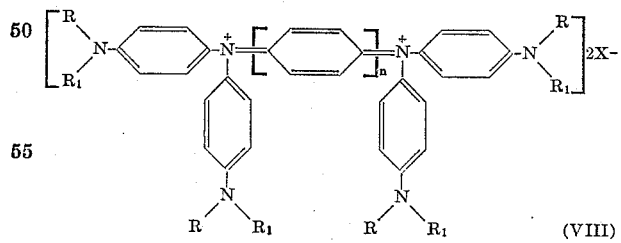

wherein, as above R is selected from allyl and the alkyls of one to twelve carbon atoms, $R_1$ is selected from hydrogen and R, $n$ is an integer selected from one or two and $X^-$ is an anion.

This is shown in the following examples typical of the general procedure.

EXAMPLE 24.—BIS(p - DIETHYLAMINOPHENYL)-[N,N - BIS - (p - DIETHYLAMINOPHENYL) - p-AMINOPHENYL] AMINIUM HEXAFLUOROARSENATE

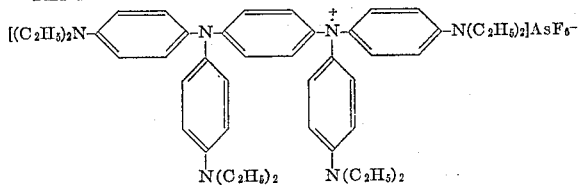

To a solution of 3.49 parts (0.005 mol) of N,N,N',N'-tetrakis(p - diethylaminophenyl) - p - phenylenediamine (product of Example 22) in 25 parts of hot dimethylformamide is added 1.49 parts (0.005 mol) of silver hexafluoroarsenate in 25 parts of dimethylformamide. After stirring for ½ hour, the mixture is filtered and the filtrate diluted with 350 parts of ether. On cooling in Dry-Ice-acetone mixture the product separates. There is obtained about 3.5 parts of green solid melting at 184°–185° C.

EXAMPLE 25.—BIS(p - DIETHYLAMINOPHENYL)-[N,N - BIS(p - DIETHYLAMINOPHENYL) - 4'-AMINOBIPHENYL]AMINIUM HEXAFLUOROARSENATE

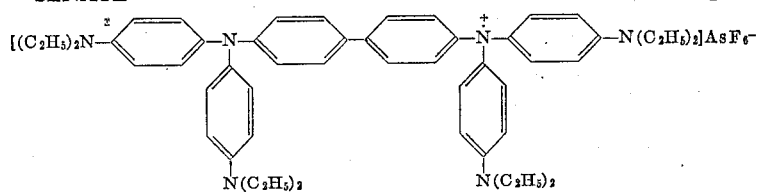

To a solution of 0.77 part (0.001 mol) of N,N,N',N'-tetrakis(p-diethylaminophenyl)benzidine (product of Example 23) in 40 parts of acetone is added dropwise with stirring a solution of 0.30 part (0.001 mol) of silver hexafluoroarsenate in 5 parts of acetone. After stirring for about five minutes the mixture is filtered and the filtrate diluted with 200 parts of ethyl ether. On cooling in Dry-Ice-acetone, a green solid separates, 0.71 part of product.

EXAMPLE 26.—N,N,N'N'-TETRAKIS(p - DIETHYL-AMINOPHENYL) - p - BENZOQUINONE - BIS-(IMONIUM HEXAFLUOROANTIMONATE)

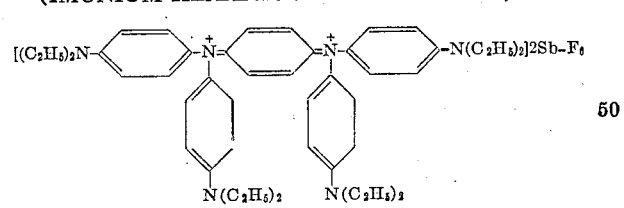

To a stirred mixture of 1.39 parts (0.002 mol) of N,N,N',N' - tetrakis(p-diethylaminophenyl)-p-phenylenediamine (product of Example 22) in 20 parts of acetone is added 1.38 parts (0.004 mol) of silver hexafluoroantimonate. After stirring for one-half hour, the dark blue solution is filtered and the filtrate diluted with 100 parts of ether. The mixture is cooled and the solid which separates is collected, washed with ether and petroleum ether and dried. There is obtained 2.1 parts of product melting with decomposition by 216° C.

Compounds of Formulae VII and VIII absorb broadly in the near infrared region of the spectrum at wavelengths longer than those obtained with compounds previously available. Improved absorption is obtained in the region of longer wavelengths between about 1000 and about 1800 millimicrons. Many of the compounds also have desirable absorption at shorter wavelengths in the near infrared region. These compounds also transmit a useful amount of visible light.

In use, these salts may be incorporated in any suitable plastic or applied on suitable transparent substrates of plastic or glass. This is done by any of several known procedures, including, for example: solution casting or dipping; hot milling; burnishing; or by dyeing. Organic plastic material containing the salts can be molded into formed articles such as sheets and plates.

We claim:
1. A compound of the formula

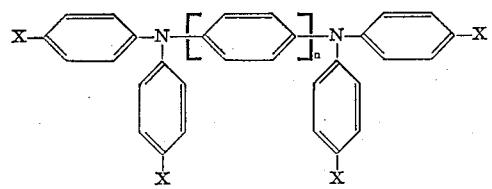

wherein X is selected from the group consisting of —NO$_2$ and NH$_2$ and $n$ is an integer selected from one and two.

2. A compound of the formula

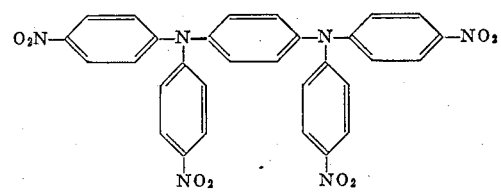

3. A compound of the formula

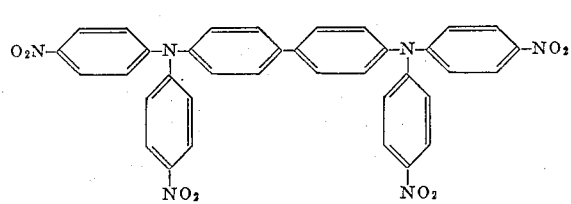

4. A compound of the formula

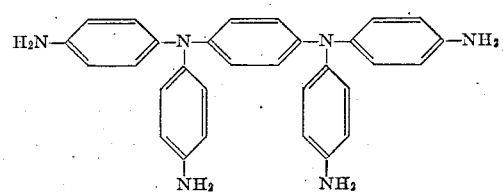

5. A compound of the formula

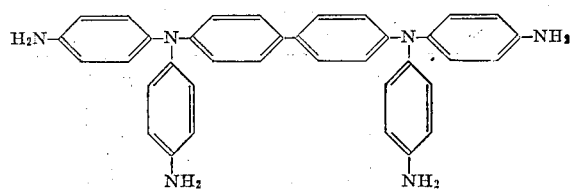

(References on following page)

References Cited by the Examiner

UNITED STATES PATENTS

| | | | |
|---|---|---|---|
| 2,118,827 | 5/1938 | Semon | 260—576 X |
| 2,942,952 | 6/1960 | Plantz et al. | 23—232 |
| 3,000,852 | 9/1961 | Merz | 260—576 X |
| 3,055,940 | 9/1962 | Merz | 260—576 |

OTHER REFERENCES

Hasegawa, Journal of Physical Chemistry, May 1962, pp. 834–836.

Nietzki, Deutsche Chemische Gesellschaft, Berichte, 1892, vol. 25, pp. 3005–3009.

Piccard, Helvetica Chimica Acta, 1924, vol. 7, pp. 789–799.

CHARLES B. PARKER, *Primary Examiner.*

DALE R. MAHANAND, ROBERT V. HINES,
*Assistant Examiners.*